United States Patent [19]

Lippman

[11] Patent Number: 4,894,112
[45] Date of Patent: Jan. 16, 1990

[54] METHOD AND APPARATUS FOR JOINING OVERLAPPING SHEETS OF THERMALLY SEALABLE MATERIAL

[76] Inventor: Glenn W. Lippman, 169 S. Buchanan Ave., Louisville, Colo. 80027-9505

[21] Appl. No.: 120,117
[22] Filed: Nov. 13, 1987
[51] Int. Cl.⁴ .................. B32B 31/26; B32B 31/00
[52] U.S. Cl. .................. 156/308.4; 156/499; 156/574; 156/579
[58] Field of Search ............... 156/499, 574, 579, 391, 156/359, 71, 157, 308.4, 322; 219/241, 243, 227, 228

[56] References Cited

U.S. PATENT DOCUMENTS

| | | | |
|---|---|---|---|
| 2,250,602 | 7/1941 | Pierce | 219/229 |
| 2,484,566 | 10/1949 | Hiller | 156/579 |
| 2,814,710 | 11/1957 | Schuetze | 156/579 |
| 2,960,592 | 11/1960 | Pierce | 219/228 |
| 4,146,419 | 3/1979 | Neidhart | 156/499 |
| 4,238,665 | 12/1980 | Tremarco | 219/243 |
| 4,642,155 | 2/1987 | Ramsey | 156/359 |
| 4,695,335 | 9/1987 | Lyall | 156/359 |

Primary Examiner—George F. Lesmes
Assistant Examiner—J. Davis
Attorney, Agent, or Firm—Duane Burton; Brian D. Smith

[57] ABSTRACT

A method and apparatus for joining overlapping sheets of thermally sealable material is disclosed. The method includes applying moving pressure to the sheets to define a moving compressed portion on the sheets, inserting heating means between the overlapping sheets and positioning and maintaining the heating means against an upstream face of the moving compressed portion so that the heating means and moving compressed portion move in unison. The sheets are heated by the heating means as such movement in unison takes place to form a liquified interfacial region between the sheets when the sheets are engulfed by the moving compressed portion. The sheets are joined to each other when the liquified interfacial region cools and solidifies. The heating means is sized and configured to cooperate and move in unison with a selected compressing means which compresses and moves the moving compressed portion along the sheets. The heating means is also sized and configured to heat the sheets as such movement in unison takes place so that the opposing surfaces of the sheets liquify to form the liquified interfacial region between the sheets.

16 Claims, 2 Drawing Sheets

U.S. Patent    Jan. 16, 1990    Sheet 1 of 2    4,894,112
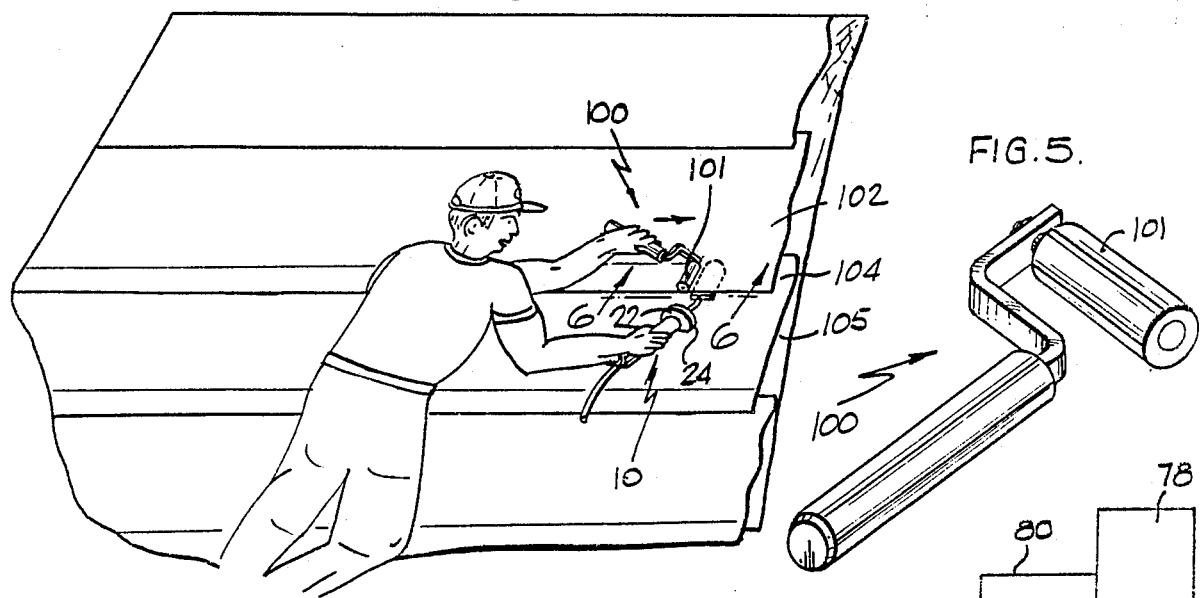
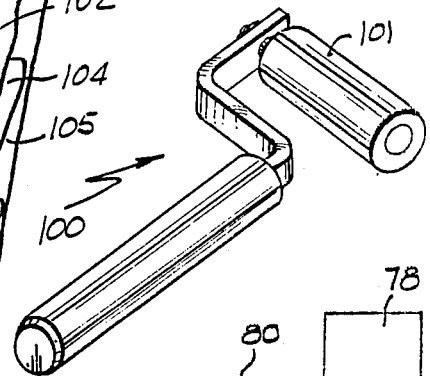
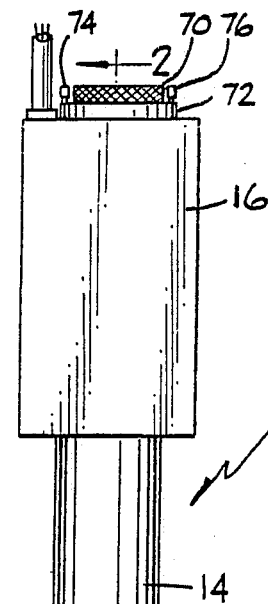
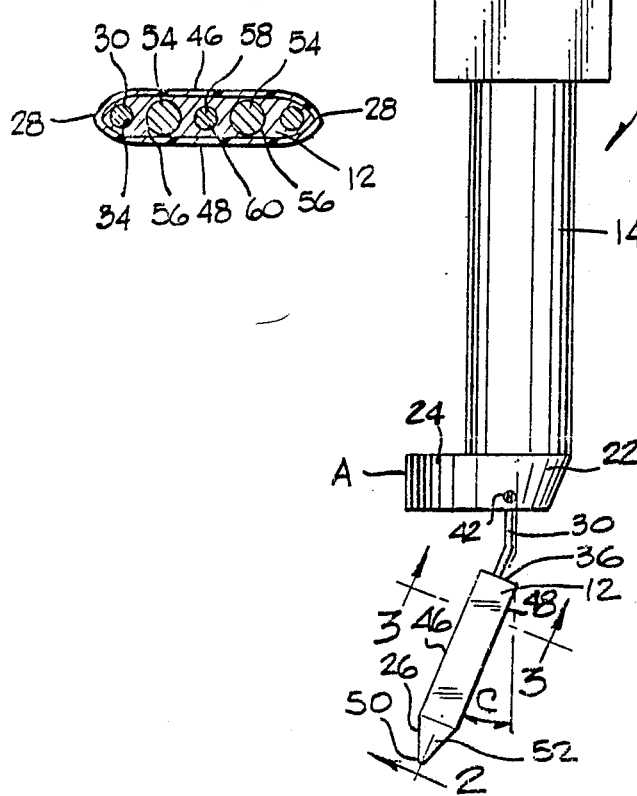
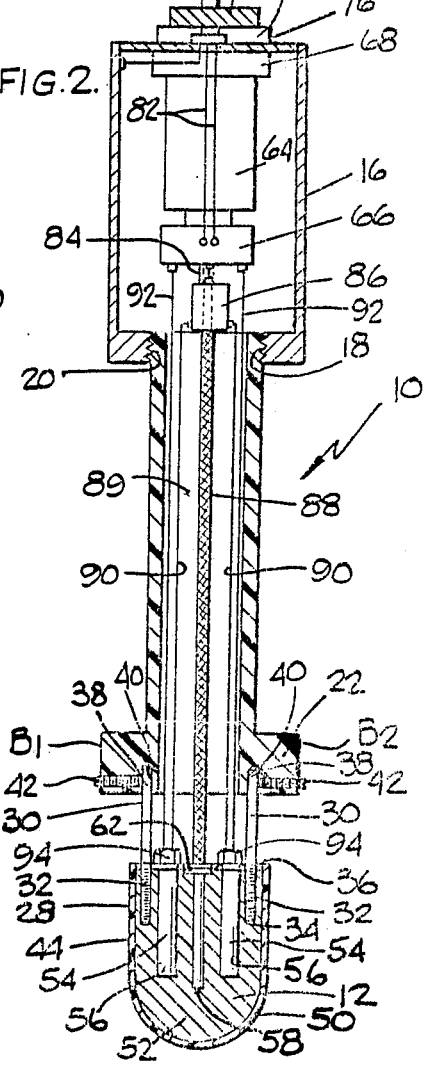

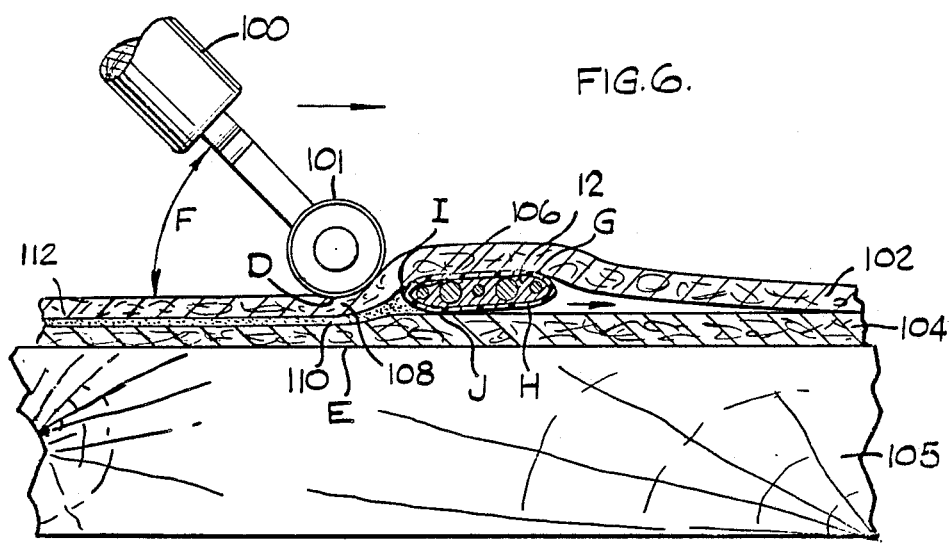

METHOD AND APPARATUS FOR JOINING OVERLAPPING SHEETS OF THERMALLY SEALABLE MATERIAL

Technical Field

The invention relates generally to a method and apparatus for joining sheets of thermally sealable material and, more particularly, to a hand held method and apparatus for both tack welding and/or sealing overlapping edges of such sheets together.

BACKGROUND ART

Pliable sheets of thermally sealable materials are commonly used in many industrial, environmental and civil construction applications. For instance, a single-ply thermo-plastic sheet is utilized as a roofing membrane to prevent leakage of water through a roof. Thermo-plastic sheets are also used as pond and landfill liners to contain hazardous waste and to prevent such waste from seeping into the ground. Typically, in such applications, large sheets of thermo-plastic materials are placed on the roof or in a containment pond with their edges overlapping. The overlapping edges are seam-welded or tack-welded to one another along or within the overlap. This sealing or tack-welding process is done manually by an artisan who separates the overlapping edges along the overlap and then heats the separated edges by directing hot air between the separated edges with a blowing gun or hot air device. When heated sufficiently, the surfaces of the separated edges liquify. The edges are then pressed together to provide a seam or tack-weld between the overlapping edges which joins the sheets together when it cools. As can be appreciated, such hot air techniques are very time-consuming and, therefore, expensive.

DISCLOSURE OF THE INVENTION

The present invention addresses the aforementioned concern by providing a method and apparatus which decreases the time required to seal or, at least, tack-weld overlapping edges of thermally sealable sheets together. Moreover, the apparatus of the present invention will require less maintenance than conventional hot air welding or sealing apparatus. The invention is also capable of producing a seam which is more uniform and thus likely to leak than that produced by conventional hot air apparatus.

The apparatus of the present invention is hand held and is used in conjunction with a moveable compressing means such as a handroller. The apparatus includes movable heating means such as a heated wedge for heating the overlapping sheets when the heating means is positioned between the sheets and against an upstream face of a moving compressed portion of the sheets. The sheets are pressed together when they are engulfed by the moving compressed portion which is compressed and moved by the moveable compressing means.

The moveable heating means is sized and configured to cooperate and move in unison with the compressing means so that the heating means maintains its position against the upstream face of the moving compressed portion as such movement in unison takes place. The heating means is also sized and configured to sufficiently heat the sheets so that opposing surfaces of the sheets liquify to form a liquified interfacial region when the sheets are engulfed by the moving compressed portion. This liquified interfacial region seals or, at least, tack-welds the sheets together when it cools and solidifies. The apparatus of the present invention also includes handle means for gripping the apparatus which is rigidly attached to the moveable heating means.

In a preferred embodiment, the moveable heating means has a metal body, preferably of stainless steel. The body defines generally parallel top and bottom surfaces and at least one rounded side extending between the top and bottom surfaces. The rounded side is sized and configured to cooperate and move in unison with a handroller and heat the sheets so that the sheets opposing surfaces liquify to form the liquified interfacial region. The rounded side serves as an abutment against which the roller of the handroller can be maintained so that movement of the handroller and metal body in unison is facilitated.

The method of the present invention includes inserting heating means between the overlapping sheets and positioning the heating means up against an upstream face of a moving compressed portion being moved along the sheets. The moving compressed portion is preferably provided by an individual pressing downwardly on the sheets with a handroller as the individual moves the handroller along the sheets. The heating means' position is maintained against the upstream face of the moving compressed portion so that the heating means and moving compressed portion move in unison along the sheets. The sheets are heated as such movement in unison takes place so that the opposing surfaces of the sheets liquify to form a liquified interfacial region between the sheets when the sheets are engulfed by the moving compressed portion. The liquified interfacial region seals or tack-welds the sheets together when it cools and solidifies.

BRIEF DESCRIPTION OF THE DRAWINGS

Other features of this invention will appear in the following description and appended claims, reference being made to the accompanying drawings forming a part of the specification where like referenced characters designate corresponding parts in the views.

FIG. 1 is a side view of a hand held apparatus of the present invention for joining overlapping sheets of thermally sealable material.

FIG. 2 is a cross-sectional view taken along the lines 2—2 of FIG. 1.

FIG. 3 is a cross-sectional view taken along the lines 3—3 of FIG. 1.

FIG. 4 is a perspective view illustrating an individual carrying out the method of the present invention wherein the individual is shown holding the welding apparatus depicted in FIGS. 1-3 and a conventional handroller.

FIG. 5 is a perspective view of the handroller illustrated in FIG. 4.

FIG. 6 is a cross-sectional view taken along the lines 6—6 of FIG. 4.

BEST MODE FOR CARRYING OUT THE INVENTION

FIGS. 1-3 illustrate a hand-held sealing apparatus 10 of the present invention for joining overlapping sheets of thermally sealable material. As used herein, joining includes tack-welding, seam-welding and sealing as such terms are used in the industry. Apparatus 10 generally includes a wedge-shape heating means or heating wedge 12, a generally cylindrically shaped handle means 14 and a control box or heat control means 16.

Handle means 14 has a male-threaded end 18 which is threadably secured to a female-threaded end 20 of control box 14. The other end of handle means 14 defines a handstop 22 which is sized and configured to prevent the hand of an individual gripping handle 14 from contacting hot wedge 12 should the individual's grip on the handle slip. Handstop 22 is also preferably sized and configured, as illustrated, to prevent the heating wedge 12 from contacting any surface upon which apparatus 10 is placed or accidentally dropped. To prevent such contact, handstop 22 defines an arcuate edge 24 which terminates or extends a slight distance beyond the surfaces of the wedge. For example, in FIG. 1 it can be seen that a point A of end wedge 24 extends slightly beyond a surface 26 of wedge 12. Similarly, in the bottom cross sectional view of FIG. 2, it can be seen that points B1 and B2 on end edge 24 extend beyond a rounded side 28 of wedge 12.

Handle means 14 and handstop 22 as illustrated in the figures are an integral one-piece unit preferably made from bakelite. However, the cylindrical portion of handle means 14 and handstop 22 could be separate pieces which could be attached by suitable means known to those skilled in the relevant art.

Returning to the figures, FIG. 2 in particular, it can be seen that wedge 12 is attached to handstop 22 of handle means 14 by a pair of bent rods 30. Each rod 30 has a threaded end 32 which is threadably secured to one of a pair of threaded bores 34. Bores 34 extend through a back edge 36 of wedge 12 and are symmetrically located on opposite sides of the wedge. The other ends 38 of rods 30 are located in a pair of bores 40 provided in handstop 22. Ends 38 are secured to the handstop by a pair of set screws 42 which are threadably disposed in threaded bores (not numbered) provided in handstop 22. Set screws 42, when tightened, tightly secure the wedge to handle means 14 by impacting up against ends 38 of the respective rods to rigidly secure the rods in place. It can also be seen that each of the rods is bent to an angle C which is depicted in FIG. 1. The importance of this angle will be described below.

Wedge 12 is preferably made from stainless steel or another heat conductive, high-strength material such as brass or a suitable aluminum alloy. Wedge 12 also preferably has a coating 44 of non-stick material such as nickel or Teflon. Teflon is a registered trademark of the E.I. DuPont de Nemours, Inc., of Wilmington, Del.. Wedge 12 is also shaped to define generally flat, parallel, top and bottom surfaces 46 and 48, respectively, and a pair of the previously mentioned rounded sides 28 which are parallel to each other and located on opposite sides of wedge 12. Each rounded edge 28 extends from the wedge's back edge 36 until it integrally adjoins a rounded front edge 50 of a wedge shaped front portion 52 of wedge 12. The wedge shape of front portion 52 is best illustrated in FIG. 1 while the arcuate shape of rounded front edge 50 is best illustrated in FIG. 2. The arcuate rounded front edge lies in a plane which is parallel to the wedge's top and bottom surfaces 46 and 48.

FIGS. 2 and 3 additionally illustrate that wedge 12 is provided with a pair of heater cartridges 54 which are mounted in a pair of complementarily shaped bores 56 provided in wedge 12. As best illustrated in FIG. 2, bores 56 extend through the back edge 36 of the wedge 12 and are located symmetrically on opposite sides of the wedge just inside of rod bores 34. FIGS. 2 and 3 also illustrate a thermocouple 58, preferably either a J or K type, which is mounted in a complementarily shaped, centrally located bore 60 of wedge 12 and secured thereto by a bolt means 62.

Cartridge heaters 54 are controlled to heat wedge 12 by a commercially available temperature controller 64 and its mounting socket 66 which are attached to control box 16 by a mounting bracket 68. Temperature controller 64 has a control knob 70 which is rotatably mounted to the controller on a control panel 72 which is attached to mounting bracket 68. Control panel preferably includes an on/off power light 74 and a current drawing light 76 which indicates when the device is drawing current. Control knob 70 enables an individual to precisely set the temperature at which wedge 12 is to be heated. 1200° F. will generally be sufficient for most materials. However, it may be necessary to heat some materials to even higher temperatures which will require either the use of heating cartridges having higher heating capabilities or more heating cartridges.

Temperature controller 64 is connectable to a source 78 of electrical power, preferably a source providing 110 volts, alternating current, via line 80 and wires 82 which are connected to the controller's socket 66. Socket 66 is, in turn, connected via a line 84 to a relay 86, preferably a 15 amp SPDT type. In addition, socket 66 is connected to thermocouple 58 via an insulated line 88 which extends through a hollow center portion 89 of handle 14. Relay 86 is connected via lines 90 to heating cartridges 54 which, in turn, are connected back to socket 66 via lines 92. Lines 90 and 92 are protected from heat radiating from wedge 12 by a pair of heat insulators 94 attached to the ends of cartridges 54, as depicted in FIG. 2. Lines 90 and 92 also extend through the hollow portion 89 of handle 14.

Controller 64 heats wedge 12 by sending current to cartridge heaters 54. When the temperature selected on knob 70 is reached, temperature controller 64 stops the flow of current to the cartridge heaters to maintain wedge 12 at the selected temperature. When thermocouple 58 detects a drop in the temperature of wedge 12, thermocouple 58 sends a signal to controller 64 causing controller 52 to redirect current to the cartridge heaters, thereby maintaining wedge 12 at the desired temperature. Cartridge heaters 54 are preferably of the 110/120 volt, alternating current, 200 to 300 watt type which are commercially available from the Dalton Electric Company of Ipswich, Mass. A temperature controller which has provided good results is the model E5C solid state temperature controller sold by the Omron Company of Schaumburg, Ill. A suitable 15 amp SPDT relay 86 is also available from the Omron Company.

FIG. 4 illustrates an individual carrying out the method of the present invention wherein the individual is shown holding a welding device 10 and a conventional handroller 100 having a hard rubber roller 101 to seal or weld overlapping edges 102 and 104 of thermally sealable sheet material together, which sheets are laying on a surface 105.

FIG. 6 which is taken along lines 6—6 of FIG. 4 best illustrates the use and cooperation of device 10 and roller 100 in accordance with the method of the present invention. As illustrated, wedge 12 of heating device 10 has been inserted between edges 102 and 104 and positioned so that its rounded side 28 is located up against an upstream face 106 of a moving compressed portion 108 of the overlapping edges.

Moving compressed portion 108 which lies generally between points D and E illustrated in FIG. 6 is compressed by the downward component of the force exerted by the individual when he or she presses downwardly on the overlapping edges with handroller 100. To maximize the application of downward force on compressed portion 108 and yet move the roller (and thus the compressed portion) in the direction indicated by the arrows in FIGS. 4 and 6, handroller 100 is preferably held at angle F depicted in FIG. 6 which as illustrated is about 45° as measured from the plane of the sheets. Angle F may vary, however, anywhere from 30° to 90° from the plane of the sheets depending upon the strength of the artisan using the handroller and the amount of pressure needed to press the sheets together. Accordingly, when sealing materials requiring a lot or pressure, it may be necessary to hold handroller 100 at an angle F approaching 90°.

Holding handroller 100 at angle F also facilitates carrying out another important step of the method of the present invention which is movement of wedge 12 and handroller 100 in unison along the overlapping edges. As used herein, "movement in unison" means that wedge 12 and handroller 100 move together (i.e., not relative to each other) with the handroller and wedge maintaining their respective positions depicted in FIG. 6 (i.e., with the downstream facing rounded side 28 of wedge 12 remaining positioned up against upstream face 106 of the moving compressed portion).

It is important, in accordance with the present invention, to maintain rounded side 28 against face 106 as such movement in unison takes place in order to maximize the transfer of heat from the wedge to the overlapping edges so that the opposing surfaces of the overlapping edges liquify to form a liquified interfacial region 110 between the sheets as the sheets are engulfed by the moving compressed portion which as previously mentioned, is compressed and moved by the individual with the handroller. The opposing surfaces of both overlapping edges 102 and 104 must liquify to form liquid region 110 so that the edges will fuse together to produce weld seam or seam 112 when the region cools and solidifies.

To facilitate movement of wedge 12 and roller 100 in unison, each rounded side 28 of wedge 12 is preferably sized and configured to provide a surface which roller 101 can abut up against. Accordingly, side 28 should preferably have a height as measured between points G and H which is almost as thick or thicker than one of the edges of the sheets being sealed together, particularly the overlapping edge. An optimum height for side 28 is approximately twice the thickness of a sheet being sealed. Each side 28 should also preferably be tapered somewhat, as illustrated, to facilitate movement of the wedge between the overlapping edges.

Movement in unison will also generally be facilitated by angling or twisting wedge 12 slightly. From FIG. 6, it can be visualized that the artisan is twisting handle means 14 slightly so that an upstream portion of the wedge's bottom surface 48 (i.e., at about point H) is slightly above the surface of bottom sheet 104. This twisting also causes the downstream portion of the wedge to move downwardly somewhat which, in turn, causes the area of the wedge near point I as illustrated in FIG. 6 to more directly face and thereby more directly oppose the force being applied by the artisan via handroller 100. By more directly opposing this force, the wedge's ability to serve as an abutment is enhanced which, in turn, facilitates movement of the roller and wedqe in unison.

Movement in unison is also facilitated by the liquified opposing surfaces of the overlapping edges which (depending on the temperature of the wedqe and pressure being applied via the handroller), generally liquify at points I and J illustrated in FIG. 6. These liquified surfaces enhance movement in unison since they serve as a lubricant between the wedqe and the overlapping edges.

The wedqe's coating 44 also facilitates movement in unison by reducing friction between the wedge and the overlapping edges, particularly between the wedge and those upstream surfaces contacting the wedge which have not liquified yet.

The wedge shaped front portion 52 and the arcuate rounded edge 50 facilitate insertion of the wedqe between the overlapped edges. In addition, the attachment of wedge 12 to handle means 14 at angle C, which is preferably about 22°, also facilitates insertion of the wedge between the sheets. This angle also makes it easier for an individual holding the device to move it in unison with the handroller along the sheets.

The temperature to which wedge 12 should be heated to liquify a sufficient interfacial region between the overlapping edges will vary with the type of sheet, the sheet's thickness and the speed at which the artisan moves the wedge and roller along the sheets. For example, a wedge moved quickly by an artisan along the sheets, will have to be heated to a higher temperature than one moved more slowly. Accordingly, it may be desirable in some situations, to heat wedge 12 to a temperature as high as 1800° F. For most artisans and materials, however, heating wedqe 12 to about 1200° F. will be sufficient.

From the foregoing description, a number of significant advantages of the present invention should be readily apparent, particularly to those skilled in the relevant art. For example, those skilled in the relevant art will appreciate that the device of the present invention will require less maintenance than devices using heated air since it does not employ any coil elements which are easily abused. Those skilled in the art will also appreciate that the method and apparatus of the present invention can be used on a wider variety of thermally sealable materials than those using heated air. For example, the invention works well on many hazardous waste containment liners which are difficult to join, particularly with hot air blowing devices. In addition, those skilled in the relevant art will recognize that the present invention can be operated with less power than those using heated air. This facilitates remote use of the device since it can be easily powered by many commercially available and economical remote electric generators.

This invention has been described in detail with reference to particular embodiments thereof, but it will be understood that various other modifications can be affected within the scope of this invention.

I claim:

1. A hand-held apparatus for joining overlapping sheets of thermally sealable material together, said apparatus comprising:

a handroller having a handle and a roller; and a hand held heating means having a handle and a heating body for heating opposing surfaces of the overlapping sheets when said heating body is positioned between and in contact with the opposing surfaces of the sheets and against an upstream face of a moving compressed portion of the sheets, the moving compressed portion being compressed and moved along the overlapping sheets by an individual pressing downwardly on the sheets with the handroller, the sheets thereby being pressed together when they are engulfed by the moving compressed portion, said heating body defining generally parallel top and bottom surfaces and two generally parallel rounded sides, said rounded sides being sized and configured to serve as an abutment for the roller of the handroller so that the roller moves the heated body sin unison with the roller as the roller is moved along the edge of the sheets with one of said rounded sides positioned against the upstream face of the moving compressed portion, said bottom surface of said rounded sides also being sized and configured to heat the opposing surfaces of the sheets as such movement in unison takes place so that the surfaces liquify to form a liquified interfacial region between the sheets when the sheets are pressed together as they are engulfed by the moving compressed portion, the liquified interfacial region joining the sheets when it cools, each of said rounded sides also being tapered and extending from a back edge to a front portion of said heating body, said back edge being rigidly attached to said handle, said front portion being generally wedge shaped so as to taper to a rounded front edge which adjoins each of said rounded sides and which terminates along an arcuate path lying in a plane which is parallel to said top and bottom surfaces, said rounded front edge facilitating insertion of said body between the sheets.

2. An apparatus as claimed in claim 1 further comprising hand stop means attached between said handle means and said heating means for preventing the hand of an individual gripping said apparatus from contacting said heating means.

3. An apparatus as claimed in claim 1 further comprising means for maintaining said heating means at a predetermined temperature.

4. An apparatus as recited in claim 3 wherein said control means includes thermocouple means for sensing the temperature of said heating means.

5. An apparatus as claimed in claim 1 wherein said heating means includes a cartridge heater.

6. An apparatus as claimed in claim 1 wherein said heating means is connectable to a source of electric power.

7. An apparatus as claimed in claim 3 wherein said control means is capable of varying the temperature at which said heating means is maintained.

8. An apparatus as claimed in claim 4 wherein the thermocouple means is a J or K type thermocouple.

9. An apparatus as claimed in claim 1 wherein said heating means is attached to said handle means by a pair of rods, each of which has a first end and a second end, said first ends being rigidly attached to said heating means and said second ends being rigidly attached to said handle means.

10. Apparatus as claimed in claim 1 wherein said rounded side has a height which is about equal to or greater than the thickness of a sheet being sealed by said apparatus.

11. An apparatus as cited in claim 1 wherein the said handle means extends longitudinally along an axis from a rear end to a front end and wherein said heating means is attached to said front end so that said heating means projects outwardly from said front end at a selected angle which is measured from the longitudinally extending axis, the angle being selected so as to facilitate insertion and positioning of said heating means between the sheets and against the upstream face of the compressed portion of the sheets.

12. An apparatus as claimed in claim 11 wherein the selected angle is about 22°.

13. An apparatus as claimed in claim 1 wherein said heating means is coated with a non-stick surface.

14. A method for joining overlapping sheets of thermally sealable material, said method comprising the steps of:
    providing an individual having two hands, a handroller having a handle and a roller and hand held heating means having a handle and a body wherein the body has a generally flat bottom and at least one inclined side;
    holding the handle of the handroller in one hand and the handle of the hand held heating means in the other hand;
    locating the roller of the handroller on the overlying sheet of the overlapping sheets near the edge of the overlying sheet;
    pressing downwardly at an angle on the overlying sheet with the located handroller to move the roller of the handroller along the edge of the overlapping sheets and to define a moving compressed portion on the sheets wherein the sheets are compressed together;
    heating the body of the heating means to temperature up to about 1800° F.;
    inserting the heated body of the heating means between the overlapping sheets near the edge of the overlying sheet;
    positioning the inclined side of the inserted heated body of the heating means against an upstream face of the moving compressed portion of the sheets so that the inclined side of the inserted heated body serves as an abutment to support the roller of the handroller so that the roller moves the heated body in unison with the roller as the roller is moved along the edge of the sheets, and inclined side being sized and configured to serve as said abutment to move the heated body in unison with the roller;
    controlling the speed at which the roller and the heated body move in unison so that the opposing surfaces of the overlapping sheets liquify to form a liquified interfacial region between the sheets when the sheets are engulfed by the moving compressed portion; and
    cooling the liquified interfacial region so that it solidifies to join the sheets together.

15. A method as claimed in claim 14 wherein said step of cooling is carried out by ambient air.

16. An method as claimed in claim 14 wherein the said step of positioning the heating means includes twisting the heating means so that it is positioned at an angle from the plane of the overlapping sheets, the angle being sufficient to enhance said step of maintaining the heating means against the upstream face of the moving compressed portion.

* * * * *

UNITED STATES PATENT AND TRADEMARK OFFICE
CERTIFICATE OF CORRECTION

PATENT NO. : 4,894,112

DATED : January 16, 1990

INVENTOR(S) : Glenn W. Lippman

It is certified that error appears in the above-identified patent and that said Letters Patent is hereby corrected as shown below:

Col. 7, claim 3, line 43, after "comprising" insert -- control--.

Col. 7, claim 1, line 15, delete "sin" and insert -- in-- therefor.

Col. 7, claim 1, line 19, delete "of" and insert --and-- therefor.

Signed and Sealed this

Fourteenth Day of July, 1992

Attest:

DOUGLAS B. COMER

Attesting Officer

Acting Commissioner of Patents and Trademarks